(12) United States Patent
Kojima et al.

(10) Patent No.: US 7,036,238 B2
(45) Date of Patent: May 2, 2006

(54) WIDTH-MEASURING METHOD AND SURFACE TEXTURE MEASURING INSTRUMENT

(75) Inventors: Tsukasa Kojima, Sapporo (JP); Junji Sakurada, Sapporo (JP); Toshiyuki Tamai, Sapporo (JP); Sadayuki Matsumiya, Kawasaki (JP); Takafumi Kano, Kure (JP); Kazushi Noguchi, Kure (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 11/018,694

(22) Filed: Dec. 21, 2004

(65) Prior Publication Data

US 2005/0132591 A1 Jun. 23, 2005

(30) Foreign Application Priority Data

Dec. 22, 2003 (JP) ............................. 2003-424481

(51) Int. Cl.
*G01B 5/004* (2006.01)
*G01B 5/02* (2006.01)
*G01B 5/20* (2006.01)

(52) U.S. Cl. .......................................... 33/503; 33/551
(58) Field of Classification Search ............... 33/502, 33/503, 543, 546, 551, 553, 554, 556, 569
See application file for complete search history.

(56) References Cited

U.S. PATENT DOCUMENTS

| | | | | |
|---|---|---|---|---|
| 4,097,996 | A | * | 7/1978 | Yamazawa et al. ............ 33/503 |
| 4,155,173 | A | * | 5/1979 | Sprandel ....................... 33/503 |
| 4,903,413 | A | * | 2/1990 | Bellwood ...................... 33/551 |
| 5,813,128 | A | * | 9/1998 | Bailey .......................... 33/502 |
| 6,453,730 | B1 | * | 9/2002 | Takemura ..................... 33/554 |
| 6,854,193 | B1 | * | 2/2005 | Lotze ........................... 33/502 |
| 2001/0008047 | A1 | * | 7/2001 | Okada et al. .................. 33/503 |
| 2002/0170196 | A1 | * | 11/2002 | Takemura et al. ............. 33/551 |
| 2005/0204571 | A1 | * | 9/2005 | Mies et al. .................... 33/503 |

FOREIGN PATENT DOCUMENTS

JP 2001-343228 12/2001

\* cited by examiner

*Primary Examiner*—G. Bradley Bennett
(74) *Attorney, Agent, or Firm*—Rankin, Hill, Porter & Clark LLP

(57) ABSTRACT

A surface texture measuring instrument has a rotary table on which a workpiece is rotatably mounted, a Z-axis slider capable of moving in a Z-axis direction parallel to a rotation axis of the rotary table, an X-axis slider that is held by the Z-axis slider and is advanceable and retractable in an X-axis direction orthogonal to the rotation axis, a first arm that is held by the X-axis slider and is rotatable around a center line parallel to the X-axis, a second arm that is held by the first arm and is advanceable and retractable in a direction orthogonal to the X-axis, and a detector held by the second arm to measure a surface texture of the workpiece.

5 Claims, 16 Drawing Sheets

WIDTH-MEASURING METHOD AND SURFACE TEXTURE MEASURING INSTRUMENT

BACKGROUND OF THE INVENTION

1. Field of the Invention

The present invention relates to a width measuring method using a surface texture measuring instrument. More specifically, it relates to a width-measuring method for measuring a width of a workpiece with a surface texture measuring instrument having a detector capable of changing measuring attitude thereof.

2. Description of Related Art

Many of detectors used in a surface texture measuring instrument such as roundness measuring instrument, surface roughness measuring instrument and contour measuring instrument are provided with a contact piece attached to a tip end of a lever pivotably moved in a direction orthogonal to a surface of a workpiece, the detectors scanning the surface of the workpiece while keeping the contact piece in contact with the workpiece surface to collect measurement data, thereby analyzing the surface texture of the workpiece and/or measuring coordinates and dimension of the workpiece.

However, since the detectors of this type are single-axis detectors that detect irregularities in pivoting direction (i.e. Z-axis (vertical) direction in a surface roughness measuring instrument and contour measuring instrument and X-axis (front and back) direction in a roundness measuring instrument), though irregularities in the pivoting direction can be highly accurately detected, the data of a workpiece surface orthogonal to the pivoting direction (i.e. along the workpiece surface) is difficult to be collected. For instance, characteristic-shape point such as workpiece edge (such edge is usually angled by ninety degrees) has been difficult to be directly detected and, especially, the width of recesses and treads of grooves and the like formed on the workpiece surface has been difficult to be accurately measured (for instance, see Japanese Patent Laid-Open Publication No. 2001-343228).

Further, since the attitude and scanning direction of the detectors relative to the workpiece are restricted, accurate scanning often cannot be conducted on a desired location of workpiece surface.

Furthermore, since the measurable area is restricted on account of interference between the components of the detector and the workpiece, desired position of the workpiece often cannot be measured.

As a result, in order to accurately measure a workpiece, in addition to the measurement of the contour and roundness of the workpiece by the surface texture measuring instrument, the workpiece has to be set on another dedicated measuring instrument to measure the width and diameter of the workpiece, which increased the measurement steps and time, thereby deteriorating the efficiency of the entire measurement of the workpiece.

In order to solve the above-described disadvantages, an object of the present invention is to provide a surface texture measuring instrument capable of overcoming the restriction on the scanning direction and measurable area of the detector relative to a workpiece and width-measuring method using the surface texture measuring instrument.

SUMMARY OF THE INVENTION

A surface texture measuring instrument according to an aspect of the present invention comprises: a rotary table on which a workpiece is rotatably mounted; a Z-axis slider capable of moving in a Z-axis direction parallel to a rotation axis of the rotary table; an X-axis slider that is held by the Z-axis slider and is advanceable and retractable in an X-axis direction orthogonal to the rotation axis; a first arm that is held by the X-axis slider and is rotatable around a first center line parallel to the X-axis; a second arm that is held by the first arm and is advanceable and retractable in a direction orthogonal to the X-axis; and a detector held by the second arm to measure a surface texture of the workpiece.

The second arm may not advance and retract in a direction orthogonal to the X-axis, but may be advanced and retracted in a direction inclined relative to the plane orthogonal to the X-axis.

The movement of the Z-axis slider, the advancement and retraction of the X-axis slider, the rotation of the first arm and the advancement and retraction of the second arm may preferably be measured.

According to the above aspect of the present invention, since freedom of the attitude and scanning direction of the detectors relative to the workpiece are improved, accurate scanning can be conducted on a desired workpiece surface.

Further, since the interference between the respective components of the measuring instrument and the workpiece can be avoided, the measurable area can be widened and any desired portion on the workpiece can be measured.

In the surface texture measuring instrument according to the above aspect of the present invention, the detector may preferably be rotatably held around a second center line parallel to an advancement/retraction direction of the second arm.

The second center line may preferably be orthogonal to the X-axis, however, is not necessarily be orthogonal thereto. The rotation of the detector around the second center line may preferably be measured.

The axis of the stylus approximately orthogonal to the detection direction of the detector (a direction for detecting the irregularities of the workpiece) and having a contact piece at the tip end thereof may preferably be approximately parallel to the second center line. Accordingly, the inclination of the stylus is not varied even when the detector is rotated.

According to the above arrangement, since the detector is rotatably held, the detection direction of the detector can be oriented as desired, thereby improving the accuracy and freedom of measurement.

A width-measuring method according to another aspect of the present invention comprises: a first measurement step in which a first surface of the workpiece is scanned by the above-described detector to obtain a first measurement data; a second measurement step in which a second surface of the workpiece is scanned by the detector to obtain a second measurement data; and a width-calculating step in which a width calculation is conducted based on the first measurement data and the second measurement data to obtain a width data.

The first surface and the second surface are oppositely located, which may, for instance, be inner left side and inner right side of a vertical cylinder, outer left side and outer right side of a vertical column and an upper side and a lower side of a horizontal collar portion.

After measurement in the first measurement step, the detector is moved by, for instance, moving the Z-axis slider, advancing and retracting the X-axis slider, and advancing and retracting the second arm, and the measurement in the second measurement step is subsequently conducted. The attitude of the detector during the first measurement step and the attitude of the detector during the second measurement step may not be identical, which may be changed by, for instance, rotating the first arm and/or rotating the detector relative to the second arm.

According to the above aspect of the present invention, since an outer left side and outer right side of a vertical column can be scanned in various directions such as Z-axis direction and Y-axis direction orthogonal to the Z-axis and X-axis, the freedom of measurement can be improved.

In the above width-measuring method, in the width-calculating step, a maximum value or a minimum value of the first measurement data and the second measurement data may preferably be calculated and a diameter of the workpiece is obtained as the width data based on the maximum value or the minimum value.

According to the above arrangement, the diameter of a column can be easily obtained by the difference between the maximum value obtained by the first measurement data measuring an outer right side of a vertical column and the minimum value obtained by the second measurement data measuring an outer left side thereof.

A width-measuring method according to still another aspect of the present invention comprises: a calibration step for calibrating the detector; a measurement step in which a surface of the workpiece is scanned by the detector to obtain a measurement data; and a width-calculating step in which a maximum value or a minimum value is calculated from the measurement data and a diameter of the workpiece is obtained as the width data based on the maximum value or the minimum value.

The calibration of the detector refers to calibrating the coordinate value of a contact piece of the detector, in which, when the contact piece measures the center position of the rotary table, the detector is calibrated so that the coordinate value becomes zero.

According to the above aspect of the present invention, after scanning the outer right side of a column in Y-axis direction to obtain a measurement data by the detector of which coordinate value has been calibrated, the radius of the column can be immediately obtained based on the maximum value in the measurement data, which is doubled to calculate the diameter, thereby extremely easily measuring the width dimension.

As discussed above, according to the width-measuring method according to the present aspect of the invention, the inner diameter and outer diameter of a cylinder and the like can be accurately and easily measured.

Further, according to the surface texture measuring instrument according to an aspect of the present invention, since the freedom of the attitude and scanning direction of the detector relative to the workpiece can be improved, any desired work surface can be accurately scanned and, additionally, since the interference between the components of the measuring instrument and the workpiece can be avoided, measurable area can be widened, so that desired portion of the workpiece can be measured.

DETAILED DESCRIPTION OF PREFERRED EMBODIMENT(S)

Preferred embodiments of the present invention will be described below with reference to the attached drawings.

First Embodiment

Figure 1:
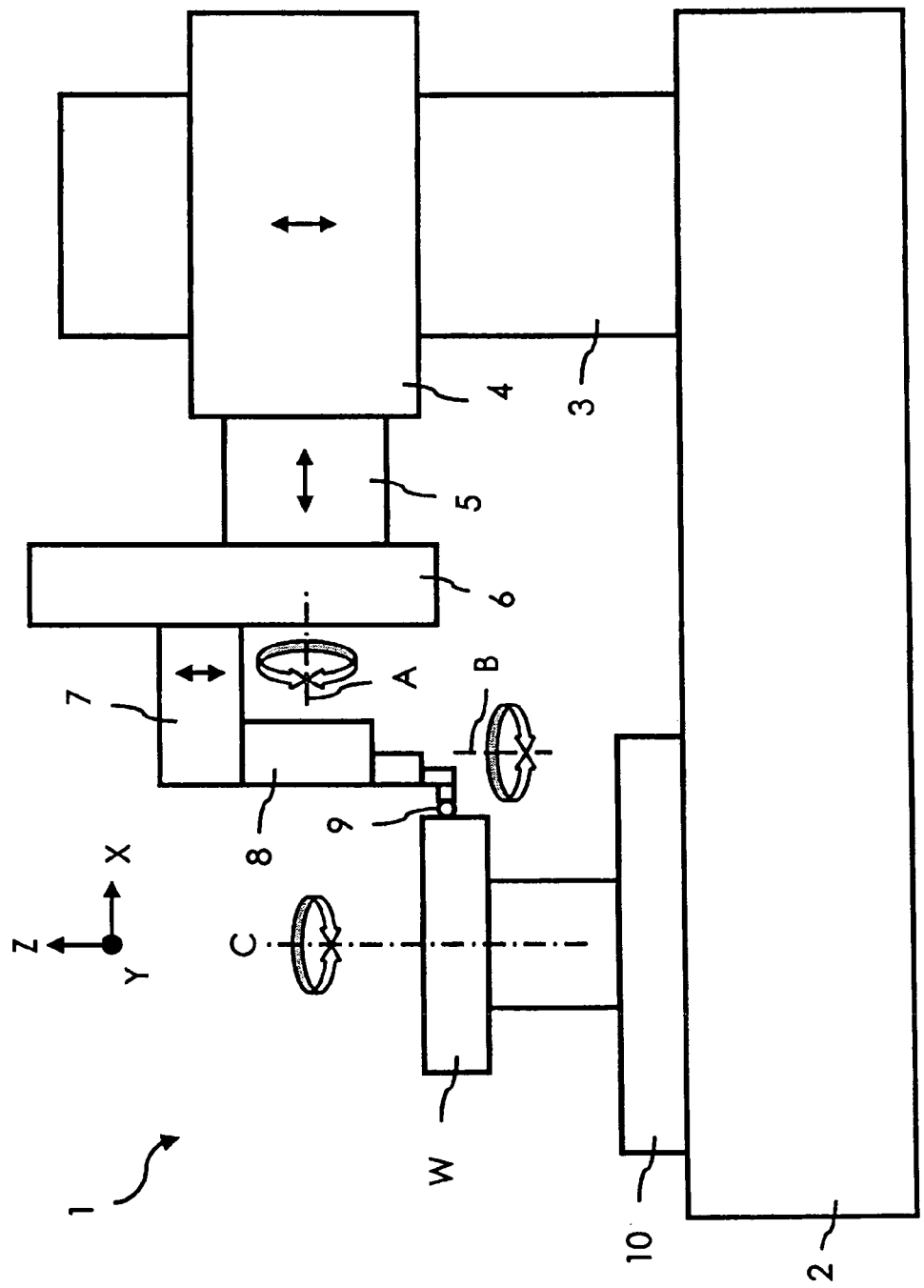
FIG. 1 is a schematic illustration showing a roundness measuring instrument according to a first embodiment of the present invention.

FIG. 1 shows a schematic arrangement of a roundness measuring instrument 1 according to a first embodiment of the present invention.

The roundness measuring instrument 1 shown in FIG. 1 has a base 2 and a rotary table 10 rotating around an axis C provided on an end of the upper side of the base 2, on which a workpiece W is rotatably mounted.

A column 3 is vertically installed on the other end of the upper side of the base 2. A Z-axis slider 4 is vertically (in Z-axis direction) slidable along the column 3. The Z-axis slider 4 holds an X-axis slider 5 in a manner slidable in right and left (i.e. in X-axis) direction.

A first arm 6 is provided on the X-axis slider 5 on the side of the rotary table 10 (leftward in the figure), the first arm 6 being rotatably held relative to the X-axis slider 5 around a center line A parallel to the X-axis. The first arm 6 holds an end of a second arm 7 in a manner slidable in vertical (as illustrated in FIG. 1) direction, i.e. in the same direction as Z-axis. However, when the first arm 6 is rotated by ninety degrees from the attitude shown in FIG. 1, the first arm 6 is horizontally laid, so that the second arm 7 is slidable in a direction orthogonal to the surface of FIG. 1, i.e. in the same direction as Y-axis.

The detector body 8 is held on the other end of the second arm 7 in a manner rotatable around a center line B. A pivotable lever having a spherical contact piece 9 at a tip end thereof (lower end in the figure) projects from the detector body 8, the lever being pivotable in right and left direction (X-axis direction) in the state shown in FIG. 1, where the contact piece 9 can sense the irregularities in X-axis direction.

Various sensors (not shown) other than the detector having the contact piece 9 is provided on the roundness measuring instrument 1, the sensors detecting a movement of the Z-axis slider 4 (Z-axis movement), movement of the X-axis slider 5 (X-axis movement), rotation of the first arm 6, movement of the second arm 7, rotation of the detector body 8 and the rotation of the rotary table 10 with a predetermined accuracy.

The roundness measuring instrument 1 is further provided with a Z-axis drive mechanism for vertically moving the Z-axis slider 4, an X-axis drive mechanism for moving the X-axis slider 5 in right and left direction, a first arm rotary mechanism for rotating the first arm 6, a second arm drive mechanism for driving the second arm 7, a detector rotary mechanism for rotating the detector body 8 and a rotary table rotating mechanism for rotating the rotary table 10, which are not illustrated.

Figure 2:
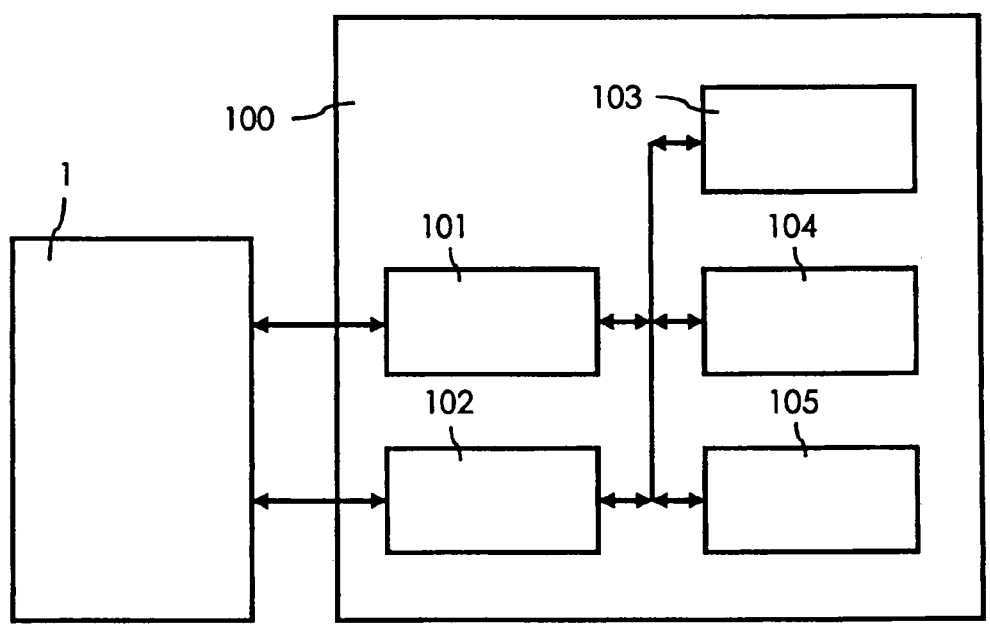
FIG. 2 is a block diagram showing a roundness measuring system according to the first embodiment of the present invention.

FIG. 2 is a block diagram of a roundness measuring system including the roundness measuring instrument 1 and a computer 100 for controlling the roundness measuring instrument 1 and processing the data thereof.

The various drive mechanisms and rotary mechanisms are connected with a controller 101 including a drive amplifier and a digital-to-analog converter to adjust the positioning location, positioning angle and positioning velocity thereof as desired. The movement and rotation detected and outputted by the various sensors are inputted to a detection input device 102 including an input amplifier and an analog-to-digital converter connected to the roundness measuring instrument.

The computer 100 further includes a central processing unit 103 for conducting various data-processing, a storage 104 for storing the data, and, further, an input/output device 105 including an input device such as keyboard, mouse and joystick for inputting a command from an operator, an output device such as a display and a printer on which the result of data-processing is outputted, and a device for inputting/outputting data from/to an external device.

The normal measurement by the roundness measuring instrument 1 includes a manual measurement and an automatic measurement.

During the manual measurement, the first arm 6 and the detector body 8 are initially held in a state as shown in FIG. 1, where the X-axis slider 5 is advanced toward the workpiece W with a manual operation by a joystick and the like so that the contact piece 9 touches the workpiece W. When the contact piece 9 (measurement piece) is in contact with the workpiece W, the X-axis slider 5 is stopped and the rotary table 10 is rotated. The pivotal movement of the contact piece 9 tracking the irregularities on the surface of the workpiece W in accordance with the rotation of the rotary table 10 is detected, which is outputted by the detector and inputted by the detection input device 102.

When the data is collected, the rotation of the rotary table 10 is stopped and the roundness and the like of the workpiece W is calculated by conducting various processing on the collected data, the result of which is displayed on the display of the input/output device 105.

During an automatic measurement, a part program created using a keyboard or inputted from an external device is executed by the central processing unit 103.

Various measurement operations are possible in accordance with the contents of the part program, which for example is an automatic processing of the above-described manual measurement, where an operator designates a part program to be executed. Since the presence of the operator is not necessary after executing the program, measurement efficiency can be improved. Various work measurements can be automated by describing in the part program, in advance, the various measurement operations in accordance with the workpiece to be measured.

Figure 3:
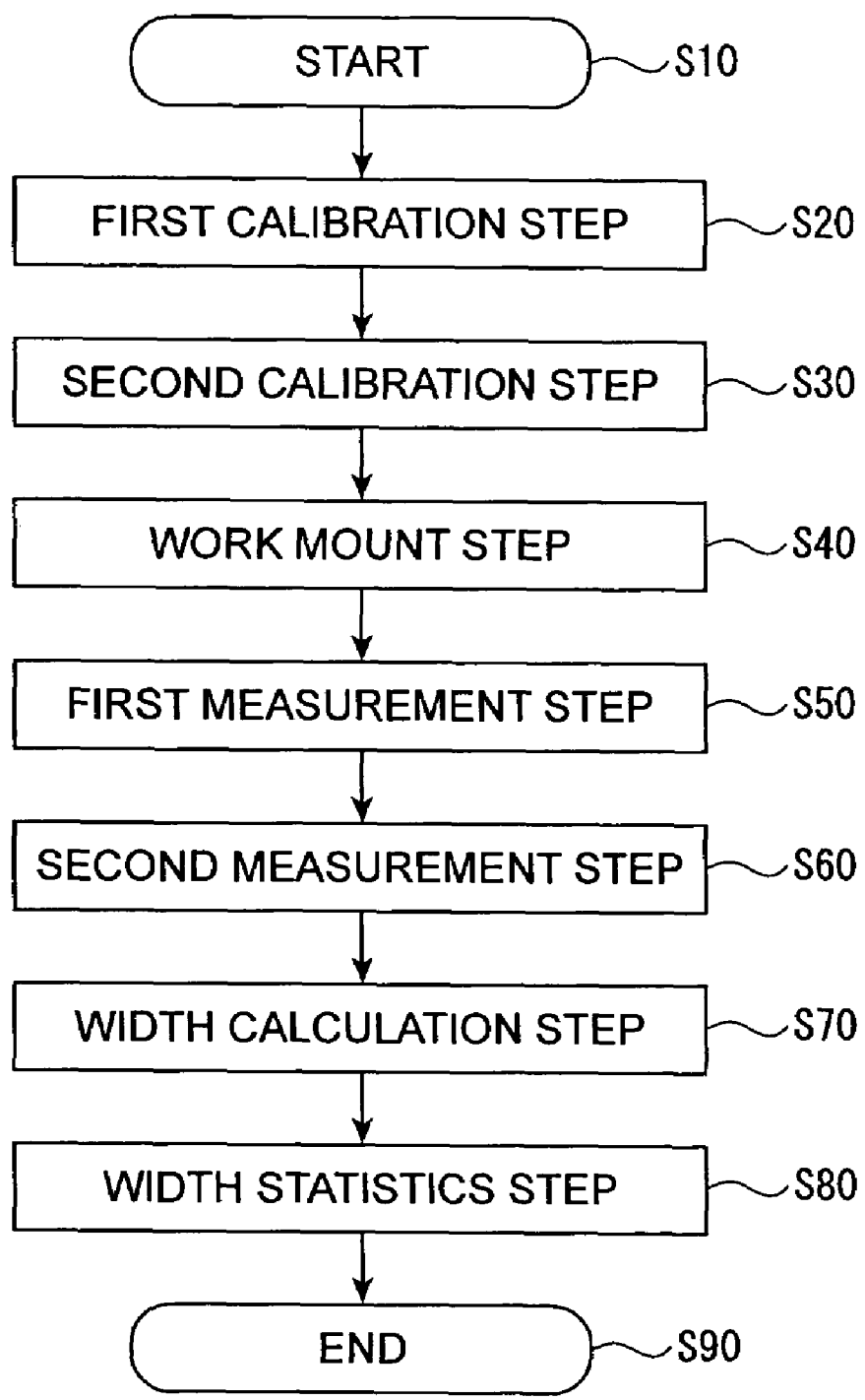
FIG. 3 is a flow chart showing a width-measuring method according to the first embodiment of the present invention.

When the width is measured in accordance with the present invention using the roundness measuring instrument 1, the measurement process is conducted in accordance with the specific steps of a flowchart shown in FIG. 3, in which either the manual measurement or the automatic measurement by the part program may be selected as desired.

Initially, the width measurement process is started in Step 10 (S10).

Figure 4:
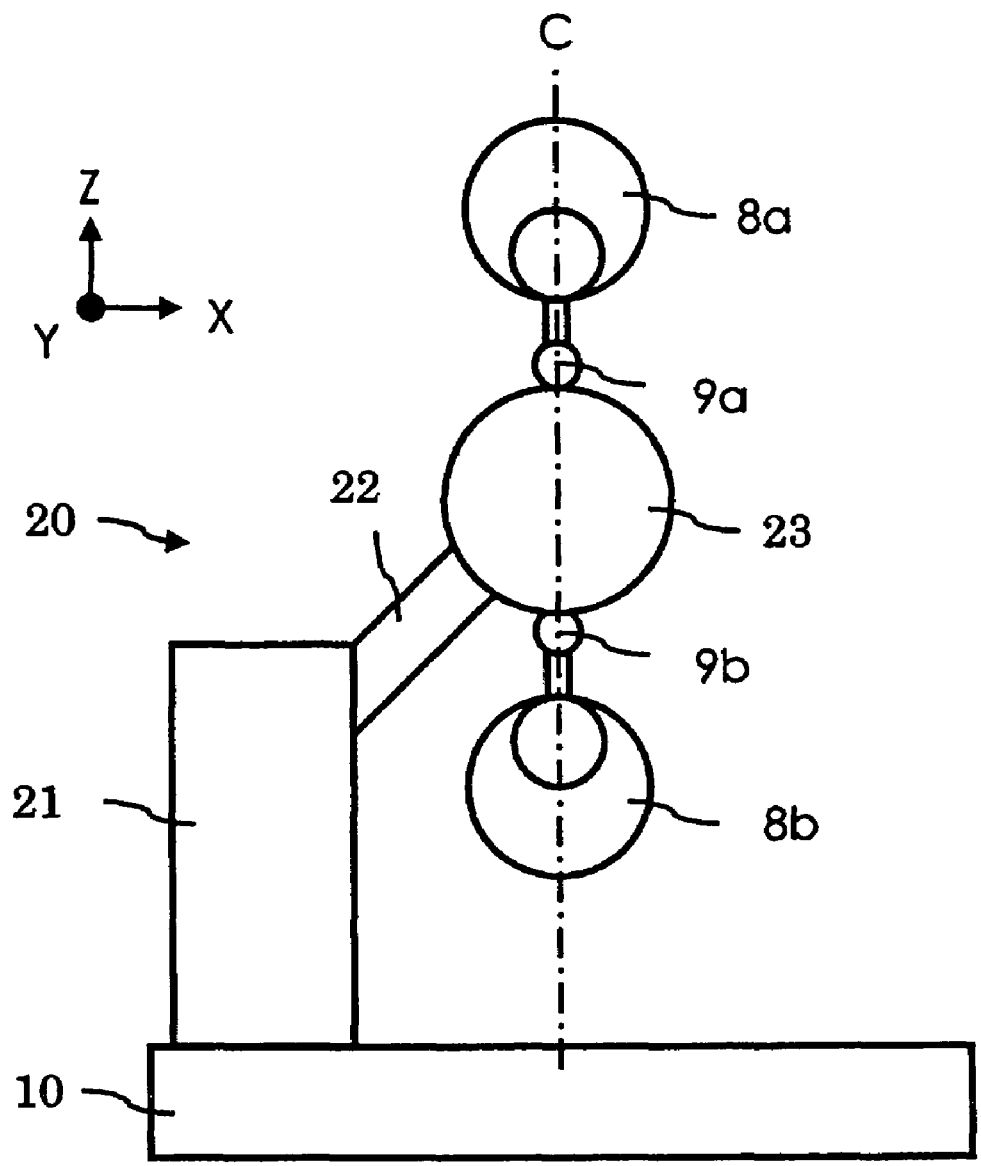
FIG. 4 is an illustration of calibration of a detector in a first and a second attitudes thereof.

Next, a calibration reference jig 20 is mounted on the rotary table 10. As shown in FIG. 4, the calibration reference jig 20 includes a vertical column 21, an inclined column 22 and a reference ball 23. The roundness of the reference ball 23 is guaranteed to a necessary accuracy. When the calibration reference jig 20 is mounted on the rotary table 10, the center of the reference ball 23 is brought consistent with the rotation axis C of the rotary table 10 with a positioning jig (not shown) and the center coordinates of the reference ball 23 are set at a predetermined value.

Subsequently, the first arm 6 and the detector body 8 are rotated and the Z-axis slider 4, X-axis slider 5 and the second arm 7 are moved to set the detector body 8 and the contact piece 9 at a first attitude as shown in FIG. 4 (illustrated as detector body 8a and contact piece 9a). Keeping the attitude, the second arm is moved so that the contact piece 9a scans the top portion of the reference ball 23 back and forth to obtain a detection result. The detection result is shown as an arc-shaped data, which is analyzed to calculate the center of the reference ball 23.

Since the radius and the center coordinates of the reference ball 23 are known, the radius of the tip end of the contact piece 9 and the center position of the contact piece 9 are calibrated to end the first calibration step (S20).

Subsequently, as shown in FIG. 4, after setting the contact piece 9 at a second attitude (illustrated as detector body 8b and contact piece 9b) in the same manner, the same calibration process as the first calibration step is conducted at the second attitude before ending the second calibration step (S30).

Next, the workpiece W is mounted on the rotary table 10. At this time, the position of the workpiece W is adjusted so that the axial center of the workpiece W is aligned with the rotation axis C of the rotary table 10 using a centering mechanism and a leveling mechanism (not shown) (S40).

In measuring the workpiece, the detector is kept at the first attitude during the first measurement step (S50) and a first surface W1 of the workpiece W is scanned to collect a first measurement data. Subsequently, the detector is kept at a second attitude during the second measurement step (S60) and a second surface W2 of the workpiece W is scanned to collect a second measurement data.

At this time, the calibration result of the first calibration step is reflected on the data obtained in the first measurement step in collecting the first measurement data, and the calibration result of the second calibration step is reflected on the data obtained in the second measurement step in collecting the second measurement data.

FIGS. 5 to 10 show how the first measurement data and the second measurement data are collected in the first measurement step and the second measurement step.

Figure 5:
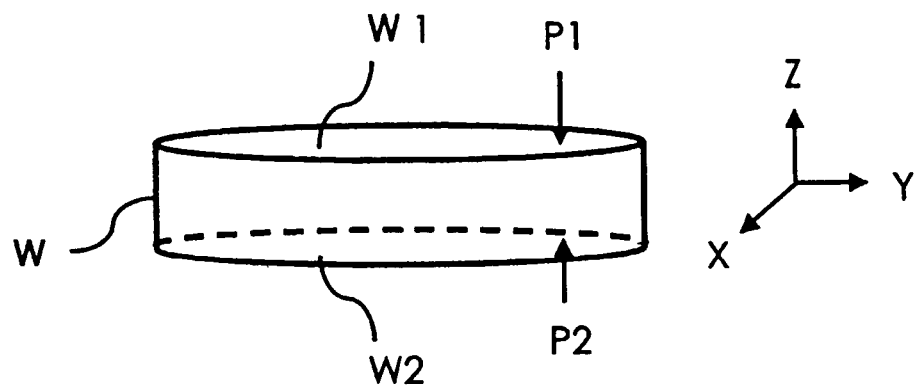
FIG. 5 is an illustration showing how point data on a workpiece is measured.

FIG. 5 shows how dot data is obtained in X-Y plane, where Z-axis data on a single point P1 on the first surface W1 of the workpiece W is collected with the first attitude of the detector (first measurement step), and, subsequently, the Z-axis data of a single point P2 on the second surface W2 of the workpiece W having the same X and Y coordinate values is collected with the second attitude of the detector (second measurement step).

Figure 6:
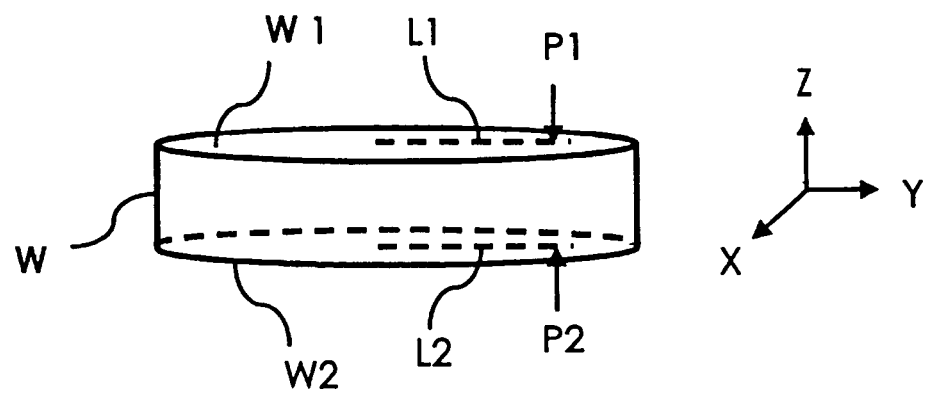
FIG. 6 is an illustration showing how line data on a workpiece is measured.
Figure 7:
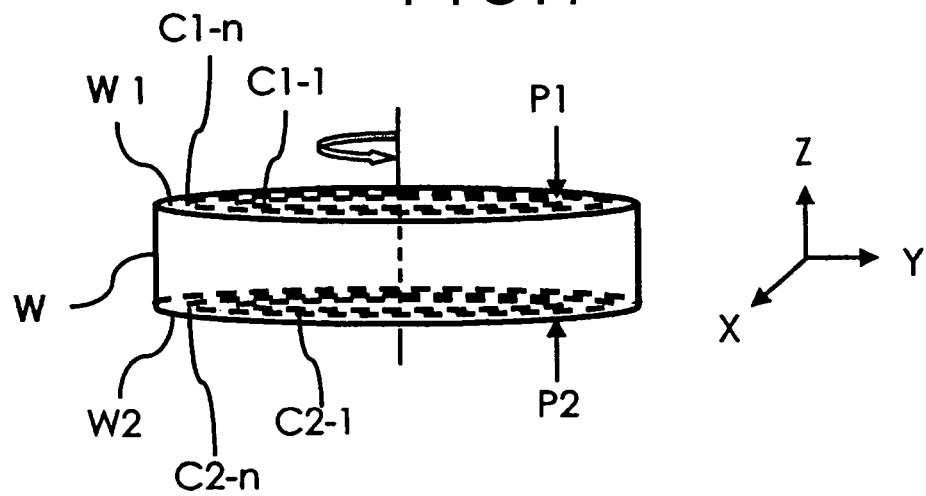
FIG. 7 is an illustration showing how face data on a workpiece is measured.

At this time, the Z coordinate value of the collected data becomes the value combining the movement of the Z-axis slider 4 and the detected value (pivot movement of the contact piece 9) of the detector, which also applies in modifications shown in FIGS. 6 and 7.

FIG. 6 shows how a line data in X-Y plane is obtained, where, in the first measurement step, the point P1 is set as a start point on the first surface W1 of the workpiece W while keeping the first attitude of the detector, and the second arm 7 is moved to scan the surface with the detector to collect the line data L1. In the second measurement step, the point P2 is set as a start point on the second surface W2 of the workpiece W while keeping the second attitude of the detector, where the X coordinate value and the Y coordinate value may be the same as the point P1, and the second arm 7 is moved to scan the surface with the detector to collect line data L2.

FIG. 7 shows how a face data on X-Y plane is obtained, where, in the first measurement step, the point P1 is set as a start point on the first surface W1 of the workpiece W while keeping the first attitude of the detector, and the workpiece W is rotated by rotating the rotary table 10 so that the detector is relatively moved to scan the workpiece W to collect circle data of C1-1.

Next, in the same manner, circle data of C1-2 . . . C1-n is collected starting from different start points in radial direction of the workpiece W. In the second measurement step, the point P2 is set as a start point on the second surface W2 of the workpiece W while keeping the second attitude of the detector, where the X coordinate value and the Y coordinate value may be the same as the point P1, and the circle data of C2-1 is collected in the same manner. Next, in the same manner, circle data of C2-2 . . . C2-n is collected starting from different start points in radial direction of the workpiece W.

Figure 8:
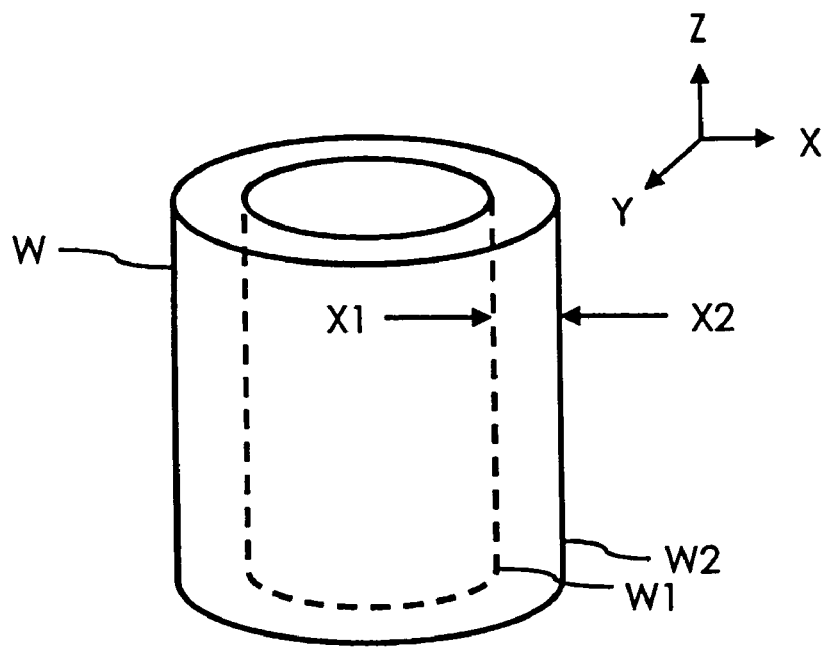
FIG. 8 is another illustration showing how point data on a workpiece is measured.

FIG. 8 shows a measurement process in which point data in radial direction of the workpiece W is collected, where X-axis data of a single point X1 on the first surface W1 (inner diameter of the workpiece W) is collected while keeping the detector at the first attitude (first measurement step) and, subsequently, X-axis data of a single point X2 having the same Y coordinate value and Z coordinate value as the point X1 on the second surface W2 (outer diameter of the workpiece W) is collected while keeping the detector at the second attitude (second measurement step).

The second attitude of the detector in collecting the radial data of the workpiece W is the same as the attitude of the detector shown in FIG. 1 and the first attitude corresponds to an attitude turning the second attitude of the detector body 8 by 180 degrees around the center line B. The same first attitude and the second attitude during radial measurement of the workpiece W are used in the following description of FIGS. 9 and 10.

Figure 9:
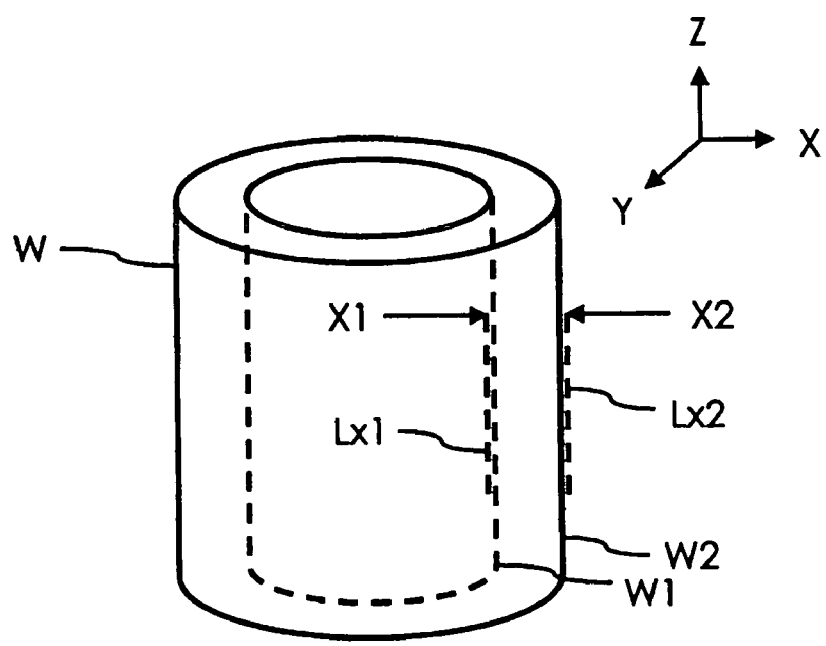
FIG. 9 is another illustration showing how line data on a workpiece is measured.
Figure 10:
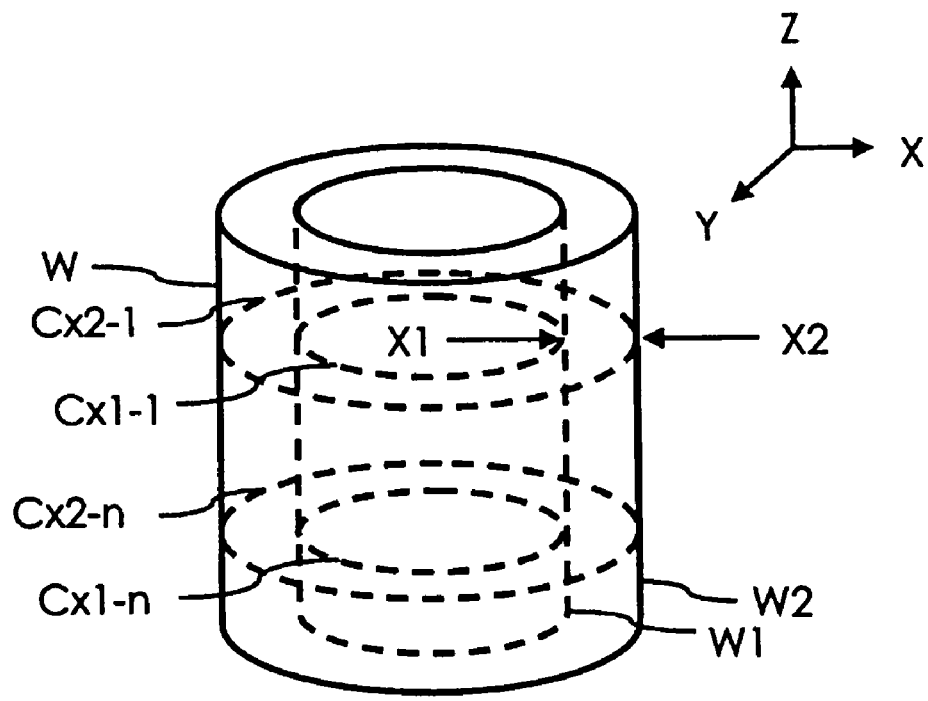
FIG. 10 is another illustration showing how face data of a workpiece is measured.

At this time, the X coordinate value of the collected data becomes the value combining of the movement of the X-axis slider 5 and the detected value of the detector (pivot movement of the contact piece 9), which also applies in modifications shown in FIGS. 9 and 10.

FIG. 9 shows how a line data in radial direction of the workpiece W is obtained, where, in the first measurement step, the point X1 is set as a start point on the first surface W1 of the workpiece W while keeping the first attitude of the detector, and the second arm 7 is moved to scan the surface with the detector to collect the line data Lx1. In the second measurement step, the point X2 is set as a start point on the second surface W2 of the workpiece W while keeping the second attitude of the detector, where the X coordinate value and the Y coordinate value may be the same as the point X1, and the second arm 7 is moved to scan the surface with the detector to collect line data Lx2.

FIG. 10 shows how a face data in radial direction of the workpiece W is obtained, where, in the first measurement step, the point X1 is set as a start point on the first surface W1 of the workpiece W while keeping the first attitude of the detector, and the workpiece W is rotated by rotating the rotary table 10 so that the detector is relatively moved to scan the workpiece W to collect circle data Cx1-1.

Next, in the same manner, circle data Cx1-2 . . . Cx1-n are collected starting from start points different in Z-axis direction of the workpiece W. In the second measurement step, the point X2 is set as a start point on the second surface W2 of the workpiece W while keeping the second attitude of the detector, where the X and Y coordinate values may be the same as the point X1, and the circle data Cx2-1 is collected in the same manner. Next, in the same manner, circle data of Cx2-2 . . . . Cx2-n are collected starting from start points different in Z-axis direction of the workpiece W.

After collecting the data by the first and the second measurement steps, width data is calculated to be obtained in width-calculation step (S70).

The simplest width data calculation is the calculation of subtraction between the first measurement data P1 and the second measurement data P2 obtained as shown in FIG. 5. In this case, since the X and Y coordinate values of the points P1 and P2 are identical, the point P2 (corresponding point) is located in Z-axis direction viewed from the point P1 (designated point). Accordingly, the width in Z-axis direction (which can be called as a thickness in FIG. 5) can be calculated only by calculating the difference between the Z-axis coordinate values of the both points (designated point and corresponding point). In the above, designation of the direction other than Z-axis direction is, naturally, useless.

The same calculation may be conducted for calculating the width data for the line data L1 and L2 obtained in FIG. 6, where, since the data is line data (a plurality of dot data), a designated point a1 is initially determined in the line data L1. The designated point a1 may be a single point in the line data L1, however, the dot data of the line data L1 may alternatively be selected for every other point as a0, a1, a2 and the like, or further alternatively all of the dot data of the line data L1 may be selected as the designated point.

Figure 12:
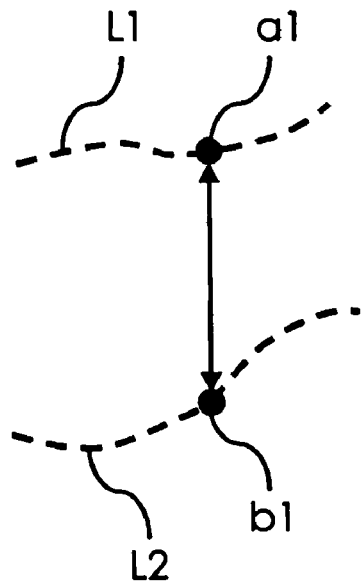
FIG. 12 is an illustration showing width calculation.

After selecting the designated point (a1 and the like), corresponding point (b1 and the like) corresponding to the designated point is searched for from among the dot data constituting the line data L2. In searching for the corresponding point, the corresponding point b1 may be located on the line data L2 in a designated direction from the designated point a1 as shown in FIG. 12, where, for instance, the corresponding point b1 located in Z-axis direction from the designated point a1 is selected. Alternatively, the corresponding point b1 located at a minimum distance from the designated point a1 may be searched for from among the line data L2 as shown in FIG. 13.

Figure 14:
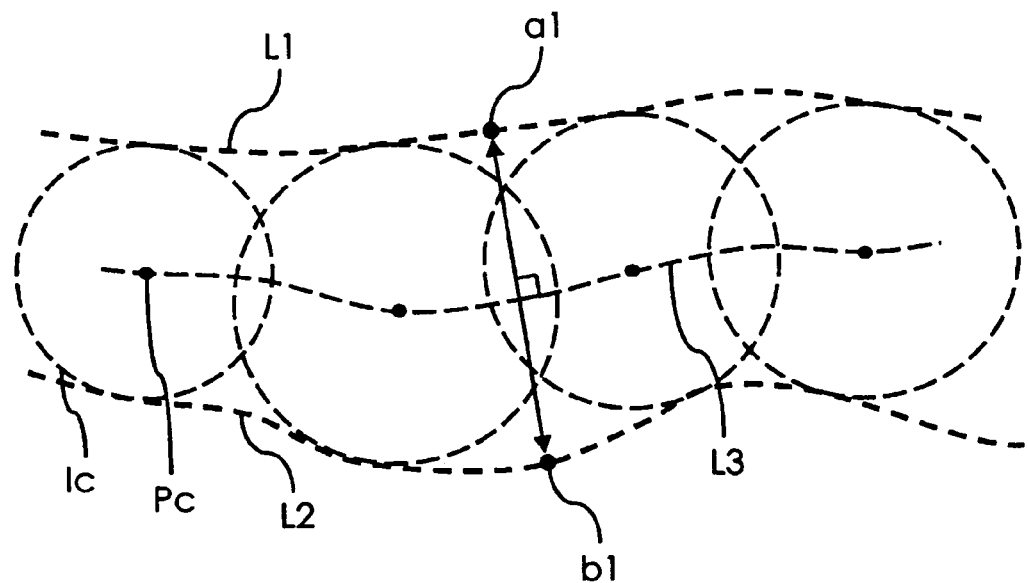
FIG. 14 is still another illustration showing width calculation.

Further alternatively, inscribed circles Ic inscribed with the line data L1 and L2 are sequentially calculated as shown in FIG. 14 and a center line L3 is drawn as the line of dots constituted by centers Pc of the inscribed circles Ic, where the designated point a1 is located on the line data L1 and the corresponding point b1 is located on the line data L2 in a direction orthogonal to selected point(s) on the center line L3.

Figure 13:
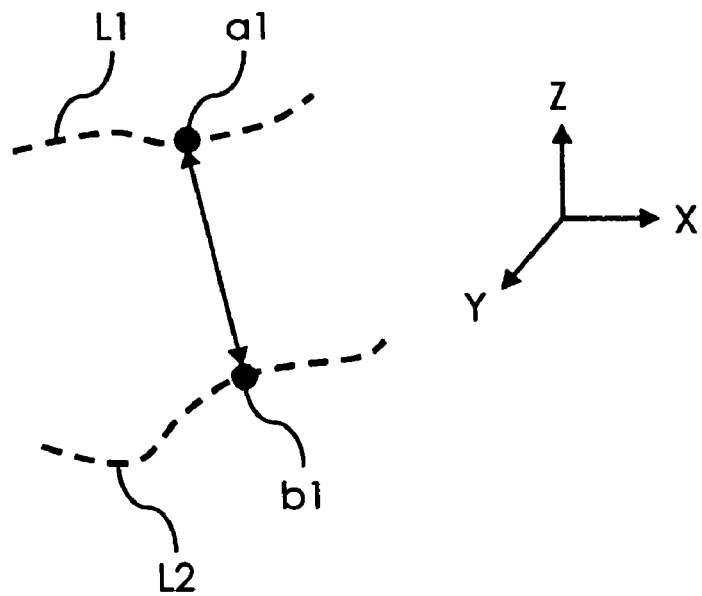
FIG. 13 is another illustration showing width calculation.
Figure 15:
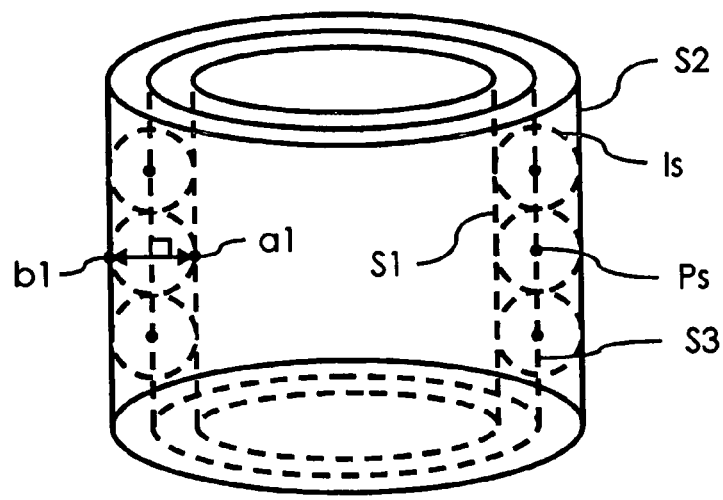
FIG. 15 is further illustration showing width calculation.

In order to calculate the width data for the face data obtained as shown in FIGS. 7 and 10, in a manner similar to the process using the inscribed circles shown in FIG. 14, inscribed spheres may be used as illustrated in FIG. 15 as an example, as well as the processes shown in FIGS. 12 to 14.

In this case, a first face S1 corresponding to the first surface W1 of the workpiece W is calculated on the basis of the first measurement data and a second face S2 corresponding to the second surface W2 is calculated on the basis of the second measurement data. Subsequently, the inscribed spheres Is inscribed with the first face S1 and the second face S2 are sequentially calculated and a center face S3 is obtained based on the line of dots constituted by the centers Ps of the inscribed spheres Is, where the designated point a1 is located on the first face S1 and the corresponding point b1 is located on the second face S2 in a direction orthogonal to the center face S3 on selected point(s) on the center face S3.

After selecting the designated point a1 and the corresponding point b1 corresponding to the designated point a1 by the above process, the distance between the designated point a1 and the corresponding point b1 is calculated as width.

When there are a plurality of designated points, the respective widths are processed to obtain the width data.

After obtaining the width data in the width-calculating step (S70), statistics processing is conducted on the width data in the width statistics step (S80). When the width data is composed of a single data, no processing is required in the width statistics step. However, if the width data contains a plurality of data, various statistics processing is conducted. The statistics processing includes extraction of the maximum and/or minimum value in the plurality of width data and calculation of statistics of average value.

When the processing is completed, the data including the first measurement data, the second measurement data, the width data and the statistics are displayed on the display in the input/output device 105, whereby the processing is completed (S90).

According to the above embodiment, following advantage can be obtained.

(1) Since the first attitude and the second attitude of the detector can be selected from a variety of attitudes, the distance between two points such as width, thickness and height at any point on a workpiece of complicated shape can be easily measured with a single-axis detector.

(2) Since the calibration result of the detector in the first attitude is reflected on the first measurement data and the calibration result of the detector in the second attitude is reflected on the second measurement data, the accuracy of the measurement can be improved. As a result, even when the width is measured based on the first measurement data and the second measurement data, accurate width measurement result can be obtained.

(3) Since any data on the first measurement data can be set as the designated point and the corresponding point can be set on the second measurement data in a predetermined direction from the designated point, the distance between the designated point and the corresponding point being the width, width of a groove on a workpiece can be accurately measured by designating a direction orthogonal to the direction of the groove regardless of the direction in which the groove to be measured is extended.

(4) Since the width is calculated on a desired point in the first measurement data as the designated point, if width is not to be calculated on some part of a workpiece, the width calculation can be omitted at the selected part.

(5) Since the corresponding point on the second measurement data having the shortest distance from the designated point on the first measurement data is searched for to calculate the distance from the designated point to the corresponding point as width, the width of the narrowest section of, for instance, a groove, can be accurately measured. Further, when a thickness of a protrusion such as a collar of a flange is measured, the thickness of the thinnest section can be accurately measured.

(6) Since the inscribed circles inscribed with the first measurement data and the second measurement data are sequentially calculated and the locus of the center of the inscribed circles is set as the center line, where the distance between the designated point in the first measurement data and the corresponding point in the second measurement data located in a direction orthogonal to the center line is calculated as a width, width data of, for instance, ball groove of a ball thread can be accurately measured.

(7) When a face can be defined respectively by the first measurement data and the second measurement data, inscribed spheres inscribed with the respective faces are sequentially calculated, where the distance between the designated point in the first measurement data and the corresponding point in the second measurement data located in a direction orthogonal to the center face formed by the center coordinates of the inscribed spheres (i.e. in normal direction) is calculated as width, the distribution of, for instance, the thickness of a cylinder can be accurately measured.

(8) Since an accurate statistics amount can be obtained based on a plurality of width data, the tendency of the width measurement result of a workpiece can be easily recognized.

Second Embodiment

Next, a second embodiment of the present invention will be described below.

Figure 16:
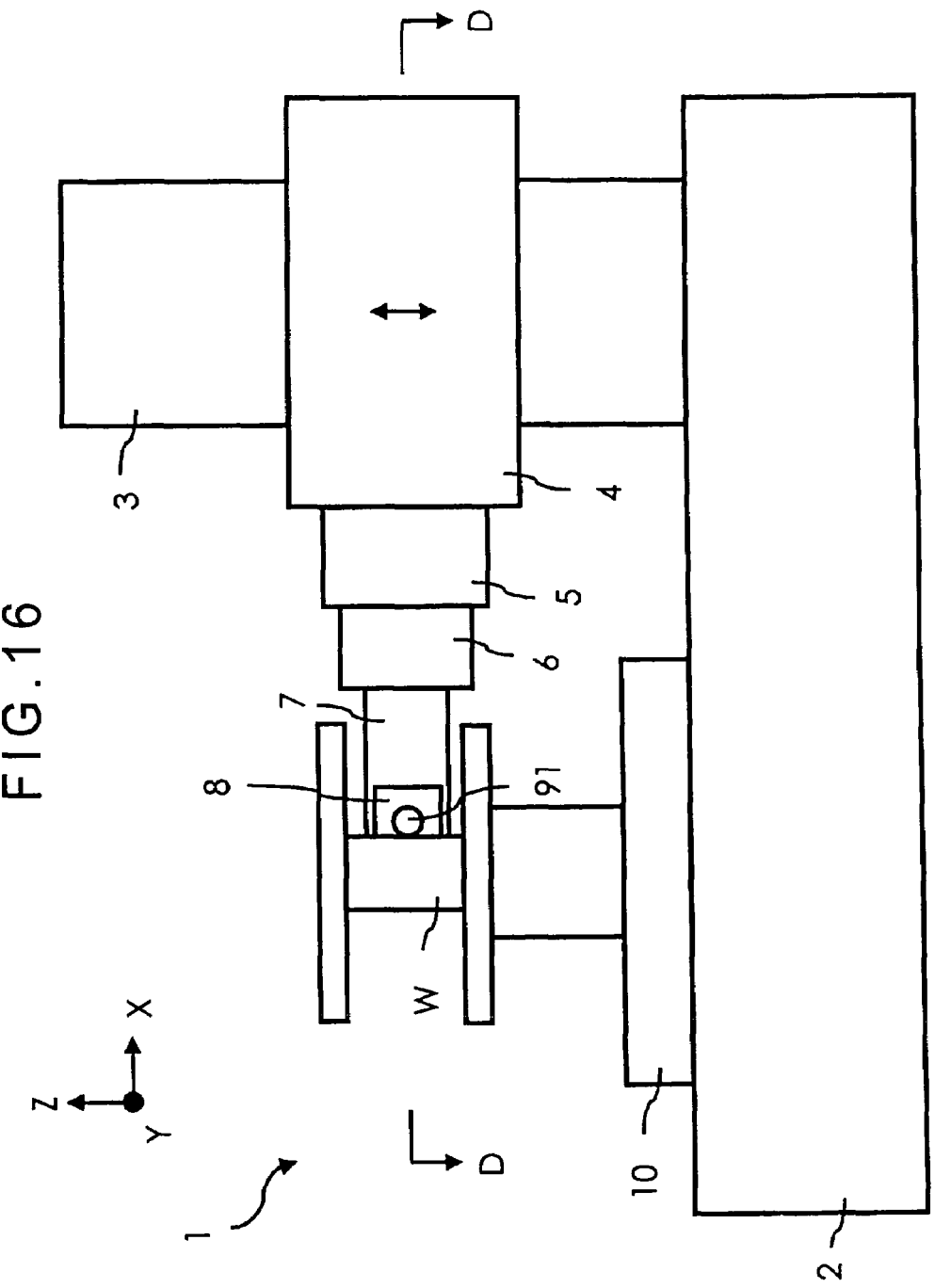
FIG. 16 is a schematic illustration showing a roundness measuring instrument according to a second embodiment of the present invention.
Figure 17:
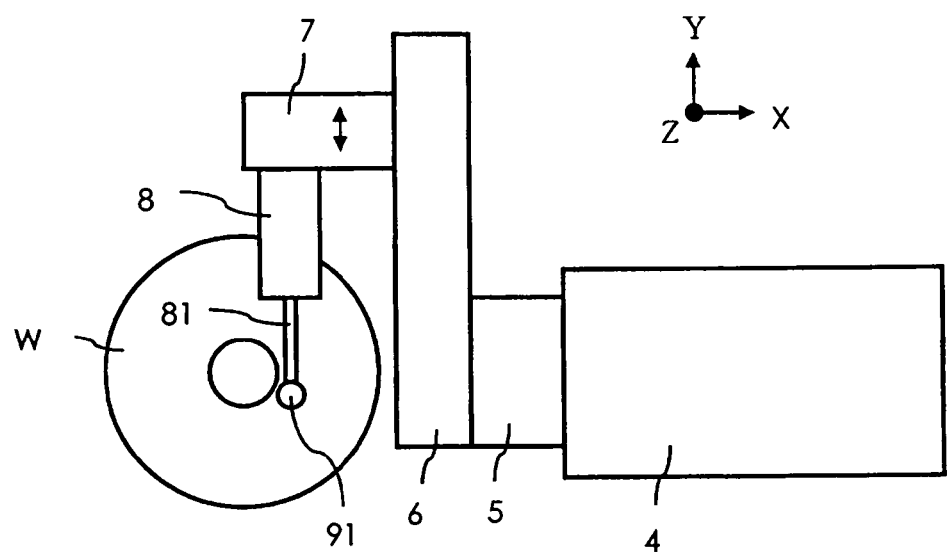
FIG. 17 is an illustration showing a scanning attitude of the roundness measuring instrument.
Figure 18:
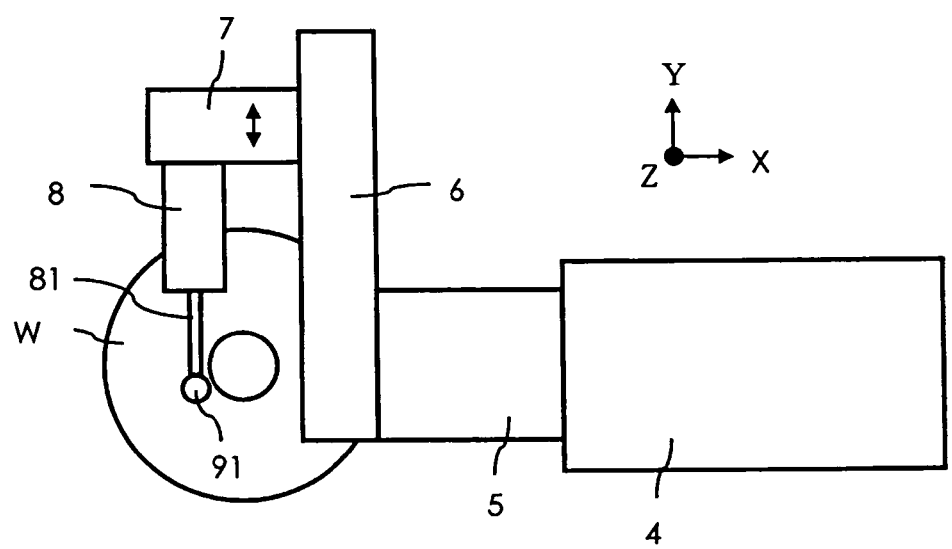
FIG. 18 is an illustration showing another scanning attitude of the roundness measuring instrument.

As shown in FIG. 16, a surface texture measuring instrument (roundness measuring instrument) used in the second embodiment is substantially identical with the instrument used in the first embodiment (FIGS. 1 and 2). Cross sections of a primary portion horizontally taken along line D—D in FIG. 16 are shown in FIGS. 17 and 18.

Unlike FIG. 1, the first arm 6 in FIG. 16 is rotated around the center line A to be horizontally held, so that the second arm 7 is capable of slide movement in horizontal (Y-axis) direction. In other words, in accordance with the slide movement of the second arm 7, the detector body 8 that is horizontally laid is advanced and retracted in Y-axis direction.

The workpiece W shown in FIG. 16 includes collars on top and bottom sides thereof. The diameter of the central column shaft sandwiched between the collars are to be measured in the second embodiment. Since such particular configuration of a workpiece cannot be measured by an attitude of the detector shown in FIG. 1, the detector body 8 laid horizontally is advanced and retracted in Y-axis direction for measurement.

The contact piece 9 in FIG. 1 protrudes in the left direction (minus X-axis direction) to detect the irregularities in the right and left directions (X-axis direction) of the outer surface of the workpiece W. When the contact piece 9 is not in contact with the workpiece W, the contact piece 9 is rested at the left end in the pivotable range of the contact piece 9.

On the other hand, a detector used in the second embodiment shown in FIG. 16 has a stylus 81 extending in a direction of the extension of the axis center of the detector body 8 and a contact piece 91 at a tip end thereof as shown in FIG. 17. As shown in FIG. 17, the regular position of the contact piece 91 is on the axis line of the detector body 8 and the contact piece 91 can be pivoted in the right and left directions in FIG. 17 to detect irregularities. In other words, when the contact piece 91 is pivoted in the right direction, the contact piece detects a protrusion in +X direction, and when the contact piece 91 is pivoted in the left direction, the contact piece detects a recess in −X direction.

Figure 19:
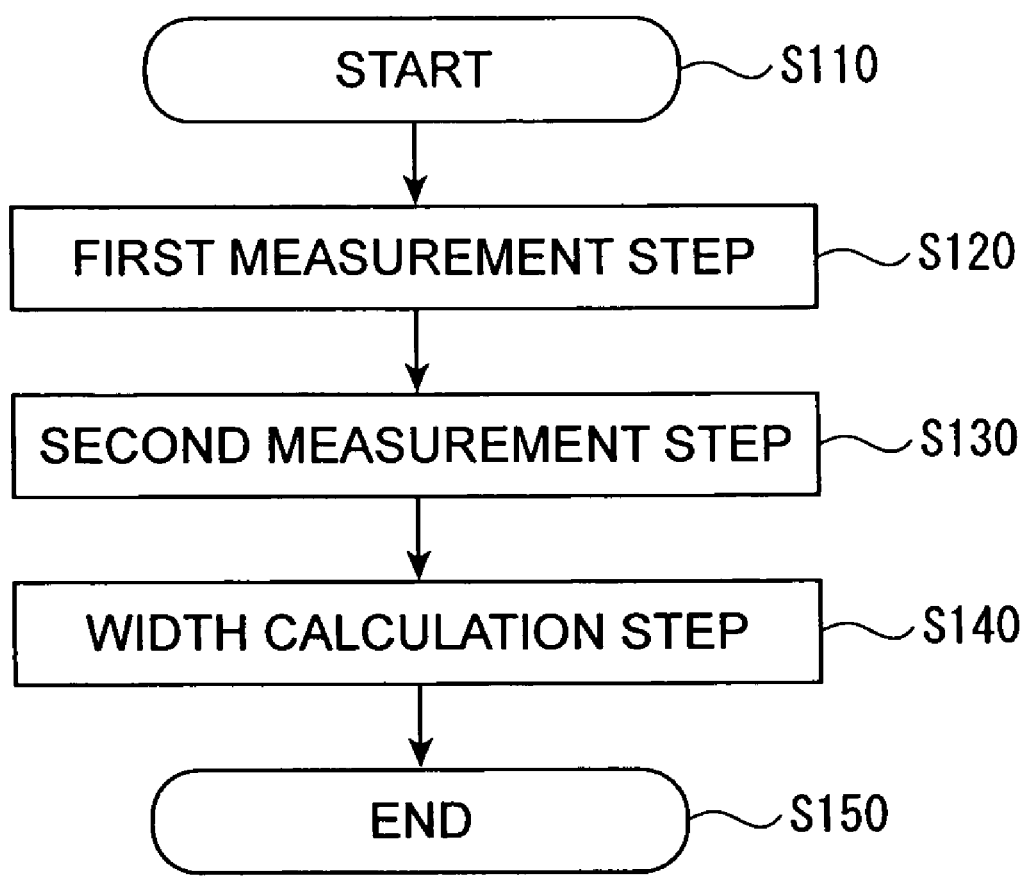
FIG. 19 is a flow chart showing a width-measuring method according to the second embodiment of the present invention.

When the width is measured (diameter measurement) in accordance with the present invention using the roundness measuring instrument 1, the measurement process follows the specific steps of a flowchart shown in FIG. 19, which may be conducted by either the manual measurement and the automatic measurement by the part program.

Initially, before starting the measurement at S110, measurement preparation steps including mounting of the workpiece W onto the rotary table 10 are completed in advance.

Next, as shown in FIG. 17, the contact piece 91 of the detector is positioned on the right side of the workpiece W and the workpiece surface including the rightmost end of the shaft of the workpiece W is scanned to obtain a first measurement data L11 (first measurement step=S120).

Then, as shown in FIG. 18, the contact piece 91 of the detector is positioned on the left side of the workpiece W and the workpiece surface including the leftmost end of the shaft of the workpiece W is scanned to obtain a second measurement data L12 (second measurement step=S130).

Figure 20:
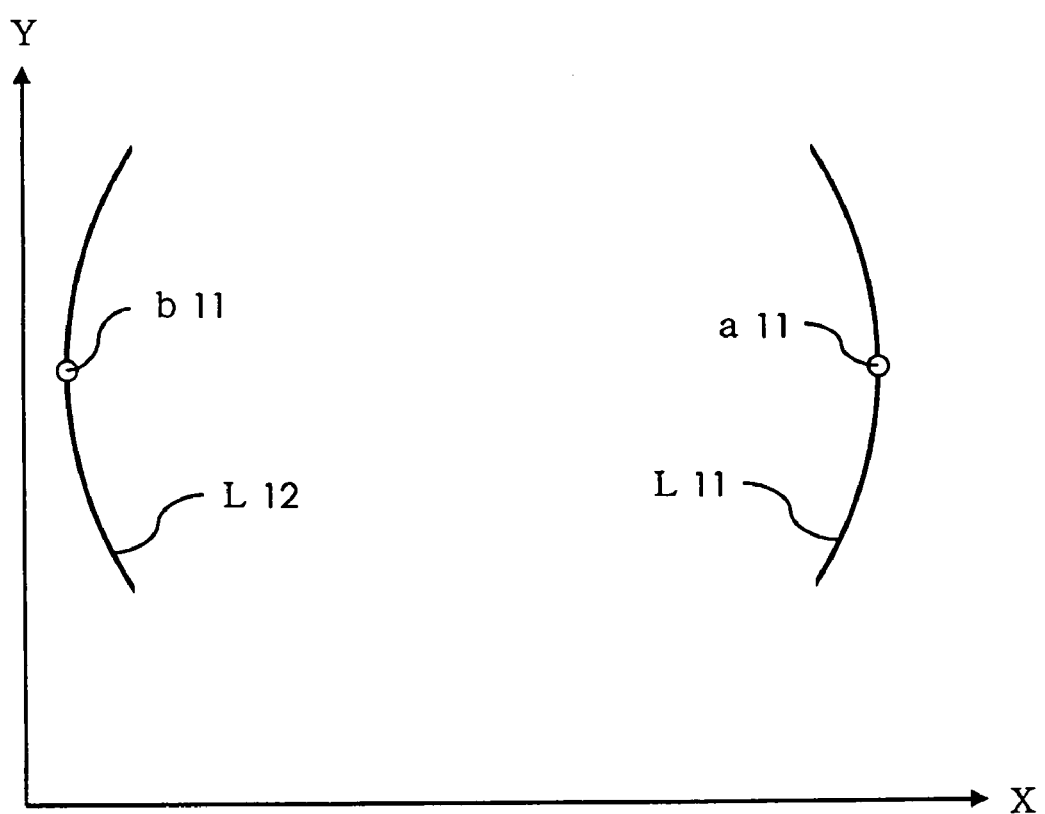
FIG. 20 is an illustration showing a measurement data according to the second embodiment of the present invention.

Subsequently, maximum value a11 is searched for from the first measurement data L11 and minimum value b11 is searched for from the second measurement data L12. The first measurement data L11 and the second measurement data L12 are data obtained in accordance with the pivot movement of the contact piece 91, in which the X-axis position of the detector body 8 is determined by the X-axis slider 5, so that, by adding the pivot movement data of the contact piece 91 with the X-axis position of the detector body 8, a data shown in FIG. 20 can be obtained. In FIG. 20, the point a11 and the point b11 respectively represent the maximum value and the minimum value of the first measurement data L11 and the second measurement data L12 in X-axis direction.

Based on the result, by calculating the subtract of the coordinates value of the maximum value a11 and the minimum value b11 in X-axis direction, the diameter of the column shaft of the workpiece W can be obtained (width-measurement step=S140).

Thereafter, the process is ended (S150).

According to the second embodiment, following advantages can be obtained.

(9) Since the detector can be kept at the most appropriate attitude in accordance with the portion of the workpiece to be measured and the measurement data can be obtained by scanning in a predetermined direction, any desired position of a workpiece of a complicated shape can be accurately measured even with a single-axis detector.

(10) After collecting the first measurement data in the first measurement step while positioning the detector at the first position, the second measurement data is collected in the second measurement step while positioning the detector at the second position, where the maximum value and the minimum value of the respective data are searched for, based on which the diameter of the workpiece is obtained, so that the workpiece can be accurately measured.

(11) Since the width data can be obtained by subtraction based on the maximum and minimum value of the measurement data, the position of the tip end of the contact piece is not necessarily calibrated and highly accurate measurement is possible with a simple measurement process.

(12) Since the inner diameter and the thickness of the thickest part and the thinnest part of a collar portion can be obtained as the width data in the same measurement method, the workpiece can be easily and accurately measured.

Third Embodiment

Next, a third embodiment according to the present invention will be described below.

Either the surface texture measuring instrument (roundness measuring instrument) used in the first embodiment (FIGS. 1 and 2) or that used in the second embodiment (FIG. 16) may be used in the third embodiment.

Figure 21:
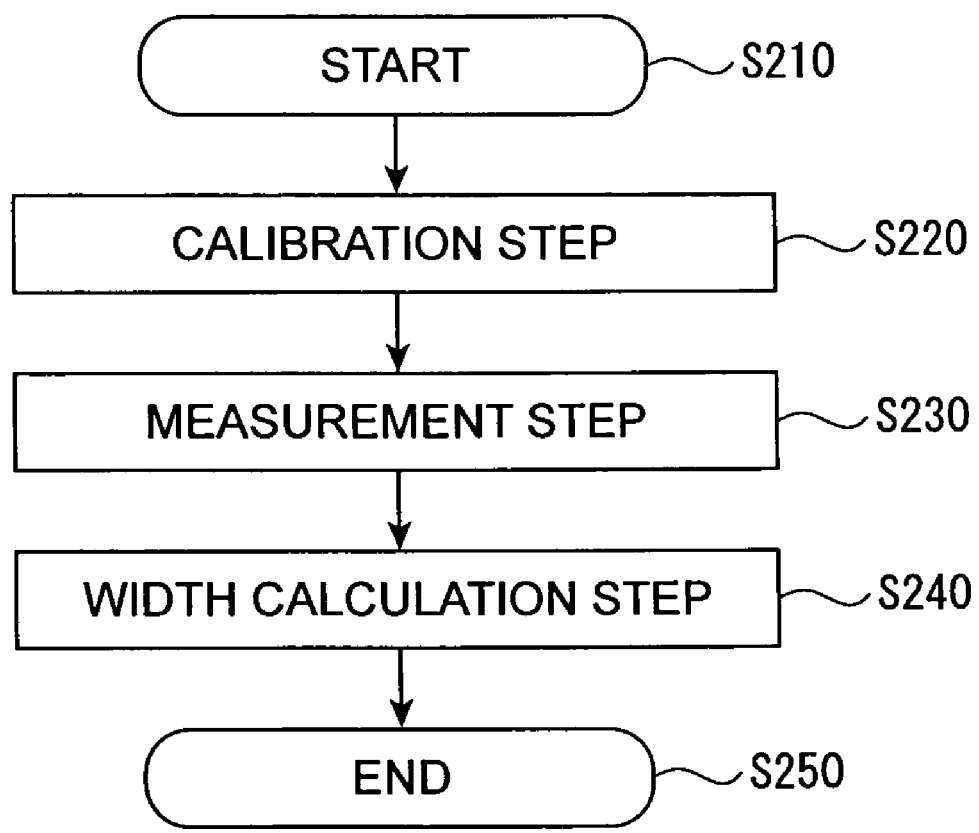
FIG. 21 is a flow chart showing a width-measuring method according to a third embodiment of the present invention.

When the width is measured (diameter measurement) in accordance with the present invention using the roundness measuring instrument 1, the measurement process follows the specific steps of a flowchart shown in FIG. 21, which may be conducted by either one of the manual measurement and the automatic measurement by the part program.

Initially, the measurement process is started at S210.

Figure 22:
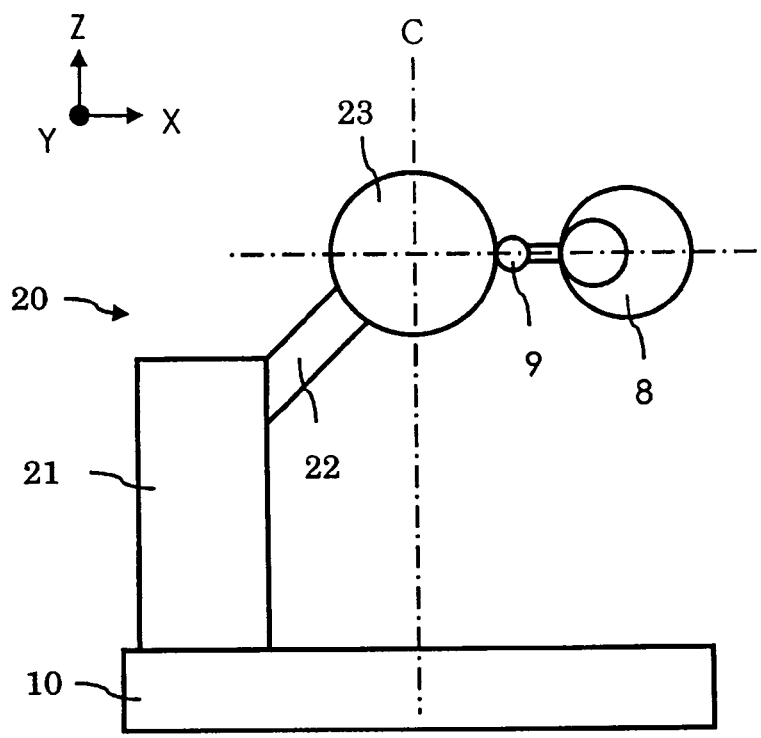
FIG. 22 is an illustration showing a calibration step according to the third embodiment of the present invention.

Subsequently, the first arm 6 is held at an attitude shown in FIG. 17 and the calibration reference jig 20 is mounted on the rotary table 10. As shown in FIG. 22, the calibration reference jig 20 includes a vertical column 21, an inclined column 22 and a reference ball 23. The roundness of the reference ball 23 is guaranteed to a necessary accuracy. When the calibration reference jig 20 is mounted on the rotary table 10, the center of the reference ball 23 is aligned with a rotation axis C of the rotary table 10 with a positioning jig (not shown) and the center coordinates of the reference ball 23 is set at a predetermined value.

Subsequently, while keeping the contact piece 9 (91) in contact with the right end of the reference ball 23, the Z-axis slider 4 is vertically moved, which is kept at a position where the pivot output of the contact piece 9 (91) is maximized in X-axis direction.

Next, the second arm 7 is advanced and retracted in Y-axis direction and is kept at a position where the pivot output of the contact piece 9 (91) is maximized in X-axis direction, where the X-axis coordinates of the contact piece 9 (91) is calibrated so that the sum of the position of the X-axis slider 5 and the pivot output of the contact piece 9 (91) is equal to the radius (diameter/2) of the reference ball 23 (S220: Calibration step).

Subsequently, the workpiece W is mounted on the rotary table 10 instead of the calibration reference jig 20 and centering and leveling of the workpiece W are conducted. In other words, the axial center of the workpiece W is aligned with the rotation axis C of the rotary table 10.

Next, as shown in FIG. 17, the contact piece 9 (91) of the detector is positioned on the right side of the workpiece W and the workpiece surface including the rightmost end of the shaft of the workpiece W is scanned to obtain a measurement data L13 (measurement step=S230).

Figure 23:
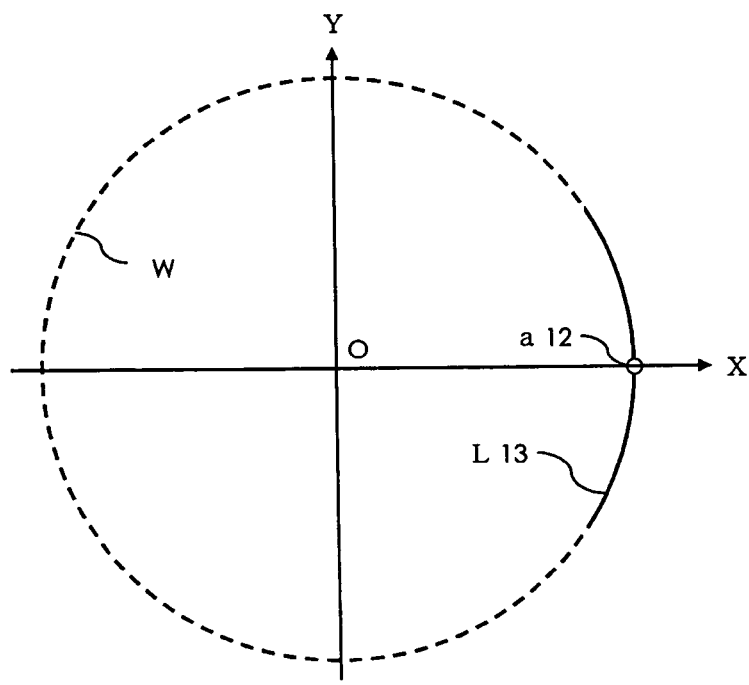
FIG. 23 is an illustration showing a measurement data according to the third embodiment of the present invention.

Subsequently, a maximum value a12 is searched for from the measurement data L13. The measurement data L13 is data obtained in accordance with the pivot movement of the contact piece 9 (91), where the X-axis position of the detector body 8 is determined by the position of the X-axis slider 5, so that, by adding the pivot movement data of the contact piece 9 (91) with the X-axis position of the detector body 8, a data shown in FIG. 23 can be obtained. The intersection point O of the X-axis and Y-axis of FIG. 23 is the origin of the coordinates, which is aligned with the axis of the workpiece W and the rotation axis C of the rotary table 10. The measurement data L13 in the measurement step is shown in a solid line while the workpiece W is shown in a dotted line. The point a12 represents the maximum value of the measurement data L13 in the X-axis direction.

Since the position of the contact piece 9 (91) is calibrated in the calibration step S220, the X-axis coordinates value of the point a12 represents the radius of the workpiece W, so that the diameter (i.e. width data of the workpiece W) can be obtained by doubling the X-axis coordinates value (S240: width-calculating step).

Thereafter, the process is ended (S250).

According to the third embodiment, following advantages as well as the advantage (9) mentioned in the second embodiment can be obtained.

(13) Since the position of the contact piece is calibrated in the calibration step, the width and diameter of the workpiece can be obtained by a single measurement step by mounting the workpiece so that the axis of the workpiece is accorded with the rotation axis of the rotary table, thereby facilitating and accelerating the measurement process.

(14) Since the inner diameter can be obtained as a width data using the same measurement method, the measurement process can be easily and accurately conducted.

Next, modifications of the present invention will be described below.

Figure 24:
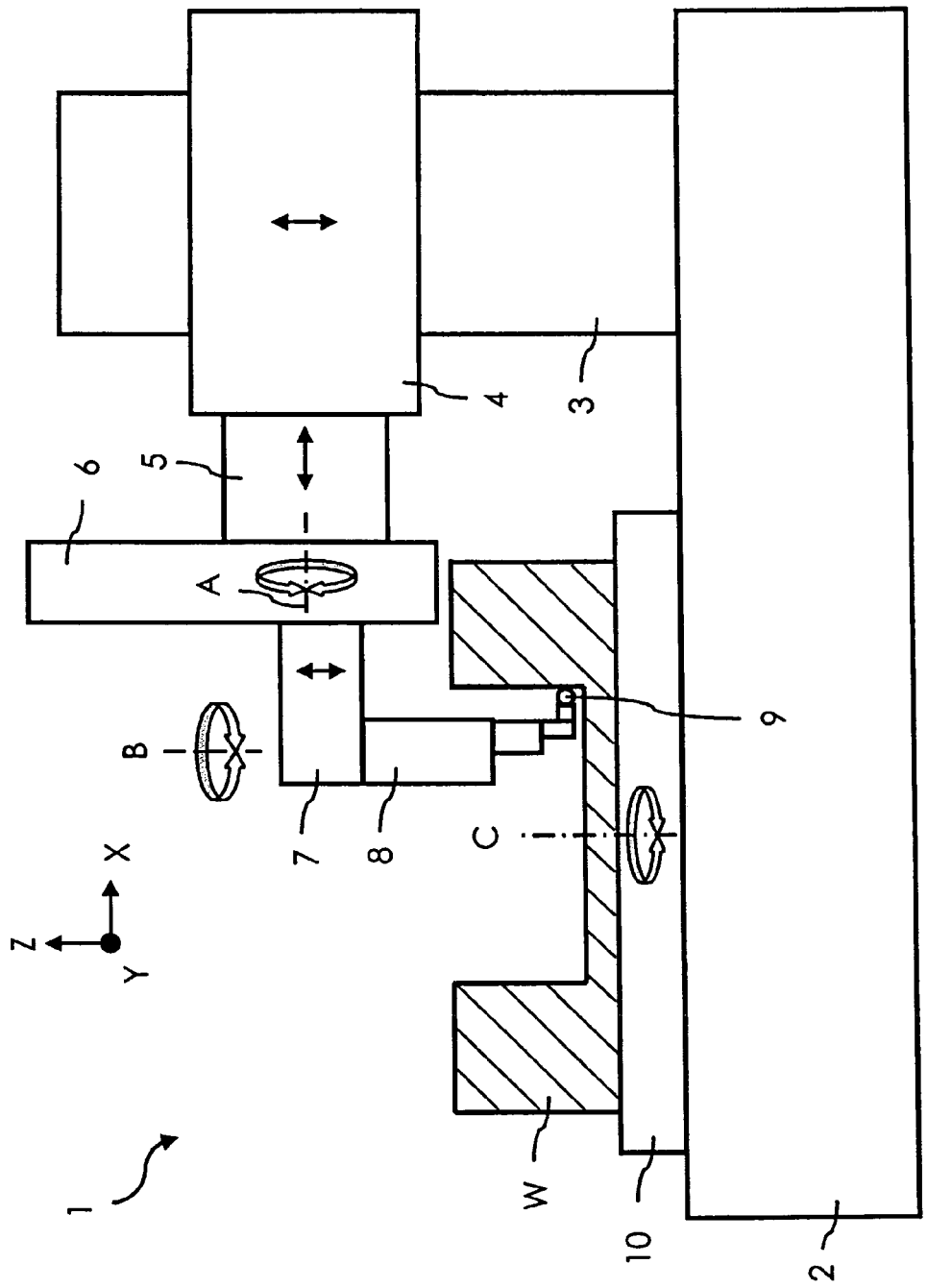
FIG. 24 is a schematic illustration showing a roundness measuring instrument according to a modification of the present invention.

FIG. 24 shows a roundness measuring instrument substantially identical with the roundness measuring instrument 1 shown in FIG. 1 except for the orientation of the detector body 8 (turned by 180 degrees), where the contact piece 9 is projected in the right direction (in +X-axis direction) relative to the detector body 8 to measure the irregularities on the inner surface of the workpiece in right and left directions (X-axis direction). When the contact piece 9 is not in contact with the workpiece W, the contact piece 9 is rested at the right end in the pivotable range of the contact piece 9.

In addition to the width measurement such as inner diameter measurement, inner roundness and inner cylindricity can be measured by the present modification. A characteristic feature of the modification is that the second arm 7 is advanceable and retractable, so that the contact piece 9 can be reached to the lower side of the inner diameter of the workpiece W, thereby widening the measurable area and improving the measurement accuracy of the desired portion of the workpiece W. Conventionally, on account of the interference between the X-axis slider 5 and/or the first arm 6 and the workpiece W, the contact piece 9 does not reach to the lower side of the inner diameter of the workpiece W. In order to overcome the problem, a long stylus has been used for measurement, which lowers the measurement accuracy, however, such long stylus is no longer required.

According to the present invention, the width such as the diameter of a workpiece can be accurately and easily measured. However, the scope of the present invention is not restricted to the above embodiments.

For instance, though single-axis detector using a pivotable contact piece is used as the detector, a two-dimensional or three-dimensional profiling detector may alternatively be used and, further, an image detector that optically collects an image data, a magnetic detector, an electrostatic detector or other optical detector may alternatively used. In other words, the present application can be applied irrespective of the presence of contact of the detectors with a workpiece.

Though the roundness measuring detector is used in the respective embodiments, a surface roughness measuring detector and the like may alternatively be used so that surface roughness, and roundness, shape and dimension of a minute configuration can be measured.

Though a circle data is used in scanning to obtain a face data in the processes shown in FIGS. 7 to 10, a plurality of line data may be used to obtain the face data.

Figure 11:
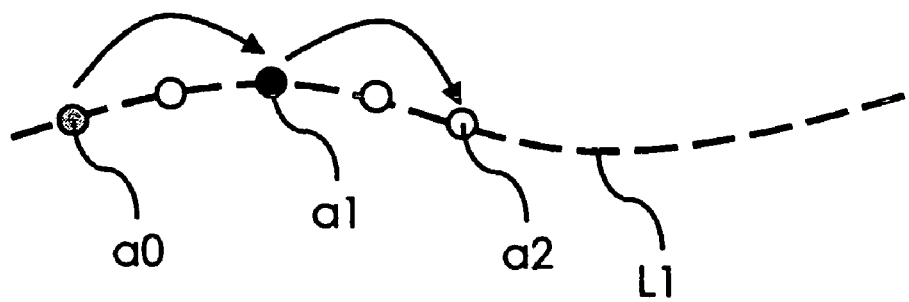
FIG. 11 is an illustration showing designated point(s)

Though the designated point and the corresponding point are selected from the dot data in the line data in the processes shown in FIGS. 11 to 13, the line data L1 and L2 may be interpolated, where designated points may be set on the interpolated curve of the line data L1 and corresponding points corresponding to the designated points may be obtained of the interpolated curve on the line data L2.

Though workpiece-rotating roundness measuring instrument is used in the embodiments, a detector-rotating type may alternatively be used.

A roundness measuring instrument is specifically used as a surface texture measuring instrument in the embodiments, the present invention may be applied in surface roughness measuring instruments, contour measuring instruments, image measuring instruments and three-dimensional measuring instruments.

Though the detector can keep a plurality of attitudes relative to the workpiece in the embodiments, the workpiece may alternatively keep a plurality of attitudes relative to the detector.

The lever including the detector and the contact piece may be automatically or manually exchanged.

The respective steps of the width measuring method according to the present invention may be implemented by executing a computer program.

The language type and execution form of the computer program are not limited and any high-level languages and computer languages that generates intermediate language such as an interpreter may be used.

The computer program may not be resident in memory, but may be loaded through a communication line and input/output device as required. Since the program for implementing the width-measuring method of the present invention requires simple calculation and is suitable for downsizing, the above implementation may also be preferably employed.

Though the contact piece 9 (91) scans the workpiece in Y-axis direction in the second embodiment (FIG. 16) and the third embodiment, the scan direction may be determined in accordance with the shape of the portion of the workpiece W to be measured. For instance, when the first arm 6 is inclined by forty-five degrees relative to the Y-axis, the workpiece can be scanned in a direction inclined by forty five degrees relative to the Y-axis on Y-Z plane. In other words, a spiral-shaped workpiece such as a screw can be accurately measured.

Though only width (diameter) is measured in the second embodiment (FIG. 16) and the third embodiment, the roundness, cylindricity, straightness in Z-axis direction of the workpiece of the column shaft can also be measured according to the attitude of the detector shown in FIG. 16.

Alternatively, by rotating the detector body 8 shown in FIG. 16 by ninety degrees around the rotation axis B so that the contact piece 9 (91) detects the workpiece in +Z or –Z direction, the width can be measured by measuring the upper side of the workpiece W and the upper and lower sides of the collar portion and the straightness and flatness can be measured by scanning a single or a plurality of points on the upper side of the workpiece W and the upper and lower sides of the collar portion in Y-axis direction by the contact piece 9 (91).

Further, the inner surface of the workpiece W can be scanned by scanning the contact piece 9 (91) in an inclined direction and rotary direction within Y-Z plane in measuring the inner diameter of the cylinder as shown in FIG. 24. Specifically, while the contact piece 9 (91) is in contact with the inner surface of the workpiece W, the first arm 6 is rotated, thereby scanning the area including the right end of the inner surface of the workpiece W. Alternatively, by advancing and retracting the second arm 7 while the first arm 6 is inclined relative to the Y-axis, the area including the right end of the inner surface of the workpiece W in X-axis direction can be scanned.

The combination of the scanning method and various detectors allows width measurement such as diameter and various surface texture measurements.

Though the second arm 7 is linearly slid to be advanced and retracted relative to the first arm 6 in the embodiments, the second arm 7 may further be rotated around the axis line of the second arm 7 (parallel to the X-axis).

Though the detector body 8 is held rotatable relative to the second arm 7 around the rotation axis B, the detector body 8 may further be advanceable and retractable in the X-axis direction relative to the second arm 7.

Though the Z-axis slider 4 advanceably and retractably holds the X-axis slider 5 in X-axis direction orthogonal to Z-axis in the embodiments, the Z-axis slider 4 may be inclinable within X-Z plane and the advancement and retraction direction of the X-axis slider 5 may be inclined at any angle relative to the Z-axis.

The priority application Number JP2003-424481 upon which this patent application is based is hereby incorporated by reference.

What is claimed is:

1. A surface texture measuring instrument, comprising: a rotary table on which a workpiece is rotatably mounted;
    a Z-axis slider capable of moving in a Z-axis direction parallel to a rotation axis of the rotary table;
    an X-axis slider that is held by the Z-axis slider and is advanceable and retractable in an X-axis direction orthogonal to the rotation axis;
    a first arm that is held by the X-axis slider and is rotatable around a first center line parallel to the X-axis;
    a second arm that is held by the first arm and is advanceable and retractable in a direction orthogonal to the X-axis; and
    a detector held by the second arm to measure a surface texture of the workpiece.

2. The surface texture measuring instrument according to claim 1, wherein the detector is rotatably held around a second center line parallel to an advancement/retraction direction of the second arm.

3. A width-measuring method for measuring a workpiece to measure a width of the workpiece with a surface texture measuring instrument, the surface texture measuring instrument having: a rotary table on which a workpiece is rotatably mounted; a Z-axis slider capable of moving in a Z-axis direction parallel to a rotation axis of the rotary table; an X-axis slider that is held by the Z-axis slider and is advanceable and retractable in an X-axis direction orthogonal to the rotation axis; a first arm that is held by the X-axis slider and is rotatable around a center line parallel to the X-axis; a second arm that is held by the first arm and is advanceable and retractable in a direction orthogonal to the X-axis; and a detector held by the second arm to measure a surface texture of the workpiece, the method comprising:
    a first measurement step in which a first surface of the workpiece is scanned by the detector to obtain a first measurement data;
    a second measurement step in which a second surface of the workpiece is scanned by the detector to obtain a second measurement data; and
    a width-calculating step in which a width calculation is conducted based on the first measurement data and the second measurement data to obtain a width data.

4. The width-measuring method according to claim 3, wherein, in the width-calculating step, a maximum value or a minimum value of the first measurement data and the second measurement data is respectively calculated and a diameter of the workpiece is obtained as the width data based on the maximum value or the minimum value.

5. A width-measuring method for measuring a workpiece to measure the width of the workpiece with a surface texture measuring instrument, the surface texture measuring instrument having: a rotary table on which a workpiece is rotatably mounted; a Z-axis slider capable of moving in a Z-axis direction parallel to a rotation axis of the rotary table; an X-axis slider that is held by the Z-axis slider and is advanceable and retractable in an X-axis direction orthogonal to the rotation axis; a first arm that is held by the X-axis slider and is rotatable around a center line parallel to the X-axis; a second arm that is held by the first arm and is advanceable and retractable in a direction orthogonal to the X-axis; and a detector held by the second arm to measure a surface texture of the workpiece, the method comprising:
    a calibration step for calibrating the detector;
    a measurement step in which a surface of the workpiece is scanned to obtain a measurement data; and
    a width-calculating step in which a maximum value or a minimum value is calculated from the measurement data and a diameter of the workpiece is obtained as the width data based on the maximum value or the minimum value.

* * * * *